Patented Oct. 2, 1951

2,569,481

UNITED STATES PATENT OFFICE 2,569,481

HOMOGENEOUS POLYMERIZATION OF UNSATURATED ORGANIC COMPOUNDS

Eugene J. Lorand, Wilmington, Del., assignor to Hercules Powder Company, Wilmington, Del., a corporation of Delaware No Drawing. Application December 4, 1946, Serial No. 713,938

10 Claims. (Cl. 260—86.7)

This invention relates to an improved process for the homogeneous polymerization of unsaturated compounds and, more particularly, to an improved process of homogeneously polymerizing vinyl, vinylidene, and vinylene compounds to provide improved synthetic polymeric materials.

It is well known that the homogeneous polymerization of vinyl-type compounds may be accelerated by various means such as by heating, use of actinic light, and use of a catalyst. In so far as the use of a catalyst is concerned, both acidic and peroxidic catalyst have been used. Of these various methods for accelerating homogeneous polymerization the use of peroxide catalysts has been most widely employed, since they have enabled the polymerizations to be carried out within reasonable lengths of time and at reasonable temperatures. Many of the previously known peroxide catalysts, however, have been disadvantageous in that they have tended to cause the polymerized materials to discolor and to produce polymers with lower average molecular weights. In addition, some of the peroxide catalysts have not been sufficiently stable at elevated temperatures to permit use of such temperatures to obtain polymeric materials which were free of strain.

Now in accordance with this invention it has been found that the homogeneous polymerization of monomeric organic compounds containing the $CH_2=C<$ group and which are capable of being polymerized by a peroxide catalyst may be carried out to advantage in the presence of an aryl(dialkyl)methyl hydroperoxide.

In carrying out the process in accordance with this invention the polymerization of vinyl, vinylidene, and vinylene compounds is effected in the usual manner utilizing the technique of homogeneous polymerization with the exception that the catalyst utilized constitutes an aryl(dialkyl)-methyl hydroperoxide. The technique of homogeneous polymerization may be carried out by either polymerizing the monomeric material in the bulk or in solution in a suitable solvent, such a solvent being unaffected by the reagents and reaction conditions utilized in the polymerization. The catalyst used in accordance with this invention permits homogeneous polymerizations at temperatures higher than those possible with previously known catalysts and thereby results in the formation of a strain-free polymer. Furthermore, the polymers have much less tendency to discolor when prepared using an aryl(dialkyl)-methyl hydroperoxide.

The following examples are illustrative of the preparation of polymers by homogeneous polymerization and the products thereof in accordance with this invention. All parts given in the examples represent parts by weight.

Example 1

To a glass polymerization vessel were added 100 parts of methyl methacrylate and 0.67 part $\alpha,\alpha$-dimethyl - p - methylbenzyl hydroperoxide. The polymerization vessel was then evacuated and sealed while the contents were under vacuum. The vessel and its contents then were heated at a temperature of 80° C. for 20 hours. Upon working up the reaction mixture there was obtained in a 100% yield a clear colorless, hard, polymethyl methacrylate polymer, which was soluble in acetone.

Example 2

Utilizing the same technique set forth in Example 1, 100 parts of 2-vinylpyridine was polymerized in the presence of 0.33 part of $\alpha,\alpha$-dimethylbenzyl hydroperoxide, the polymerization being carried out at 50.4° C. for a period of 68 hours. There was obtained a 100% yield of a hard, dark orange polymer of 2-vinylpyridine, and this polymer was soluble in both ethanol and benzene.

The above experiment was duplicated with the exception that 0.52 part of benzoyl peroxide was used in place of the $\alpha,\alpha$-dimethylbenzyl hydroperoxide. The 2-vinylpyridine polymer resulting from this experiment was much darker in color than the one prepared using $\alpha,\alpha$-dimethylbenzyl hydroperoxide and was obtained in a 90% yield.

Example 3

Following the procedure of Example 1, 100 parts of styrene was polymerized in the presence of 0.24 part of $\alpha,\alpha$-dimethyl-p-isopropylbenzyl hydroperoxide utilizing a reaction temperature of 64.8° C. and a reaction time of 50 hours. The resulting reaction mixture was colorless and when dissolved in benzene, precipitated with methanol, and dried gave a white, powdery polystyrene in a 40% yield. The yield was increased to 100% when the reaction was run at 60° C. for 135 hours.

Substantial duplication of the above experiment, except for the use of $\alpha,\alpha$-dimethyl-p-methylbenzyl hydroperoxide, a temperature of 80° C., and a reaction time of 96 hours, afforded a 97% yield of polystyrene.

Example 4

Utilizing the technique described in Example 1 a mixture of 50 parts of styrene and 50 parts of methyl methacrylate was copolymerized in the presence of 0.97 part of α,α-dimethylbenzyl hydroperoxide. A temperature of 65° C. was used and the reaction time was 15 hours. The reaction product was a viscous solution and this solution was dissolved in acetone and the copolymer precipitated by the addition of hexane. There was obtained in a 23% yield, a white, powdery copolymer which was soluble in both acetone and benzene.

The aryl(dialkyl)methyl hydroperoxides used in the process of this invention may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction.

The aryl(dialkyl)methyl hydroperoxides used in the process of this invention have the following structural formula

in which $R_1$ and $R_2$ represent alkyl groups, Ar represents a substituent selected from the group consisting of aryl and alkaryl groups and X represents the hydroperoxy (—OOH) group. As illustrative of the alkyl-substituted aromatic organic compounds which may be oxidized, p-cymene, cumene, diisopropyl benzene, and sec-butyl benzene may be mentioned. These compounds lead to α,α-dimethyl-p-methylbenzyl, α,α-dimethylbenzyl, α,α-dimethyl-p-isopropylbenzyl, and α,α-ethyl methylbenzyl hydroperoxides, respectively. These compounds also may be named as aryl(dialkyl)methyl hydroperoxides. For example, α,α-dimethylbenzyl hydroperoxide may be designated as phenyl(dimethyl)methyl hydroperoxide. The aryl and alkaryl groups need not be derived from benzene, as is the case in the aforementioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl, and the like, the same alkyl groups also being representative of $R_1$ and $R_2$ in the structural formula. $R_1$ and $R_2$ may be either the same or different.

The amount of hydroperoxide which may be used in accordance with this invention may be from about 0.001 to about 5.0%, based on the amount of monomeric organic compound present. The preferable amount of hydroperoxide on this basis, however, is from about 0.01 to about 1.0%.

Compounds which may be advantageously polymerized in accordance with this invention include the conjugated butadiene hydrocarbons, butadiene and its derivatives such as isoprene, dimethyl butadiene, chloroprene, etc., and other compounds containing the vinyl group such as styrene, acrylonitrile, etc. Through utilization of the hydroperoxide catalysts, copolymers such as those of butadiene and styrene or acrylonitrile, isoprene and styrene or acrylonitrile, and methyl methacrylate and styrene may be prepared. The catalysts also are useful in the preparation of polymerized styrene, methyl methacrylate, methyl vinyl ketone, methyl isopropenyl ketone, vinyl pyridine, and the various other addition polymers of similar nature.

The polymerizations may, in general, be carried out under conditions well known in the art for homogeneous polymerization. The temperature of the polymerization reaction may vary from about 25° C. to about 150° C., a preferable temperature range being from about 50° C. to about 100° C. Although the examples have shown the removal of air from the reaction vessel prior to carrying out the polymerization, it is not necessary that this procedure be followed. The polymerizations may be carried out in the presence of air and in so doing may be effected by refluxing the reactants in an open reaction vessel. The examples also have utilized bulk polymerization as one of the possible variations of a homogeneous polymerization. Another type of homogeneous polymerization which may be utilized, however, is that in which a solvent, such as benzene, toluene, xylene, hexane, acetone and the like, is present. Styrene, for example, may be dissolved in toluene and the polymerization carried out using the resulting solution. The examples have shown the use of glass reaction vessels, but any material such as stainless steel which does not inhibit the polymerization may be used in construction of the reaction vessel.

The aryl(dialkyl)methyl hydroperoxide catalysts of this invention are advantageous in that they permit the preparation of polymers which are lighter in color than those prepared using many of the previously known peroxide catalysts. Furthermore, through practice of this invention it is possible to produce strain-free polymers by employing higher polymerization temperatures, the hydroperoxides of this invention being more effective at higher temperatures than the previously known peroxide catalysts due to increased stability at such temperatures. Finally, it is possible to produce the aryl(dialkyl)methyl hydroperoxides commercially at a lower cost, consequently, the use of these hydroperoxides is economically advantageous. This application is related to the copending application of Eugene J. Lorand, Serial No. 656,539, filed March 22, 1946. The latter application is concerned with an emulsion polymerization process whereas the present application is directed to a homogeneous polymerization process.

What I claim and desire to protect by Letters Patent is:

1. The process which comprises homogeneously polymerizing a monomeric organic compound containing the $CH_2=C<$ group and which is capable of being polymerized by a peroxide catalyst in the presence of an aryl(dialkyl)methyl hydroperoxide in which each alkyl group contains not more than 4 carbon atoms as the catalyst.

2. The process which comprises homogeneously copolymerizing two monomeric organic compounds containing the $CH_2=C<$ group and which are capable of being polymerized by a peroxide catalyst in the presence of an aryl(dialkyl)-methyl hydroperoxide in which each alkyl group contains not more than 4 carbon atoms as the catalyst.

3. The process which comprises homogeneously polymerizing a monomeric organic compound containing the $CH_2=C<$ group and which is capable of being polymerized by a peroxide catalyst in the presence of from about 0.001 to about 5% by weight, based on the monomer, of an aryl-(dialkyl)methyl hydroperoxide in which each alkyl group contains not more than 4 carbon atoms as the catalyst.

4. The process which comprises homogeneously polymerizing a monomeric organic compound containing the $CH_2=C<$ group and which is capable of being polymerized by a peroxide catalyst in the presence of from about 0.01 to about 1.0% by weight, based on the monomer, of an aryl(dialkyl)methyl hydroperoxide in which each alkyl group contains not more than 4 carbon atoms as the catalyst.

5. The process which comprises homogeneously polymerizing a monomeric organic compound containing the $CH_2=C<$ group and which is capable of being polymerized by a peroxide catalyst in the presence of $\alpha,\alpha$-dimethyl-p-methylbenzyl hydroperoxide as the catalyst.

6. The process which comprises homogeneously polymerizing a monomeric organic compound containing the $CH_2=C<$ group and which is capable of being polymerized by a peroxide catalyst in the presence of $\alpha,\alpha$-dimethylbenzyl hydroperoxide as the catalyst.

7. The process which comprises homogeneously polymerizing a monomeric organic compound containing the $CH_2=C<$ group and which is capable of being polymerized by a peroxide catalyst in the presence of $\alpha,\alpha$-dimethyl-p-isopropylbenzyl hydroperoxide as the catalyst.

8. The process which comprises homogeneously polymerizing methyl methacrylate in the presence of $\alpha,\alpha$-dimethyl-p-methylbenzyl hydroperoxide as the catalyst.

9. The process which comprises homogeneously polymerizing styrene in the presence of $\alpha,\alpha$-dimethylbenzyl hydroperoxide as the catalyst.

10. The process which comprises homogeneously copolymerizing methyl methacrylate and styrene in the presence of $\alpha,\alpha$-dimethyl-p-isopropylbenzyl hydroperoxide as the catalyst.

EUGENE J. LORAND.

REFERENCES CITED

The following references are of record in the file of this patent:

UNITED STATES PATENTS

| Number | Name | Date |
|---|---|---|
| 2,367,805 | Semple | Jan. 23, 1945 |
| 2,395,523 | Vaughan et al. | Feb. 26, 1946 |
| 2,403,772 | Vaughan et al. | July 9, 1946 |
| 2,446,797 | Vaughan et al. | Aug. 10, 1948 |

OTHER REFERENCES

Hock et al., Berichte, vol. 77, pages 257–264 (1944).